Feb. 13, 1934.　　　　　I. ELLIOTT　　　　　1,946,843
BAKING OVEN
Filed Aug. 7, 1930　　　5 Sheets-Sheet 3

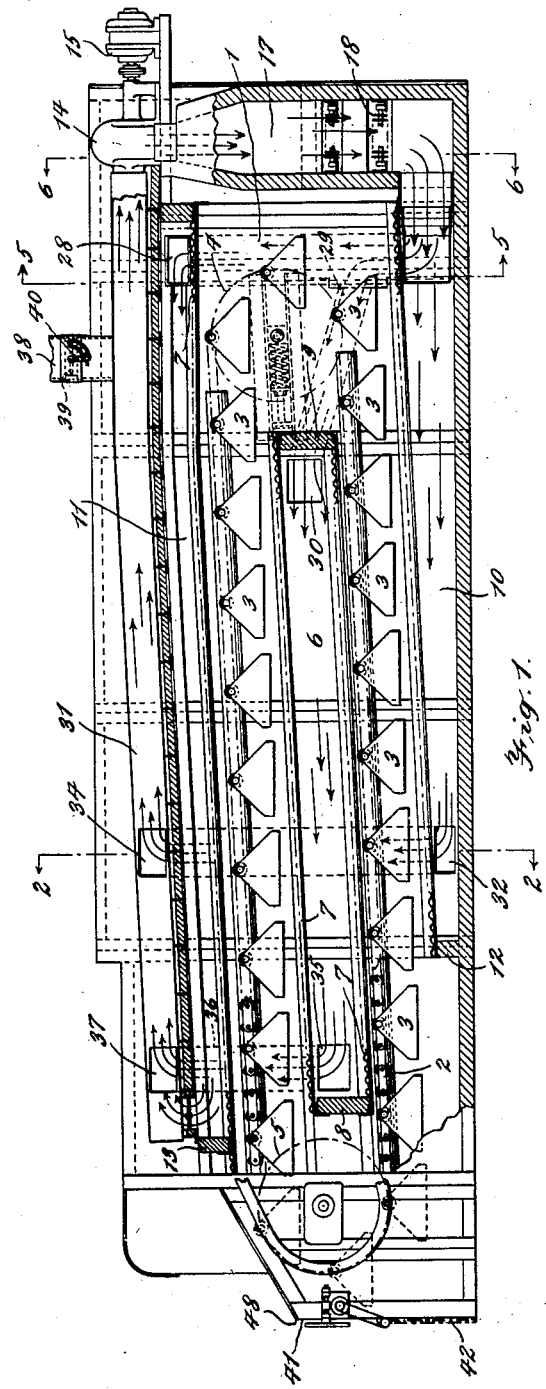

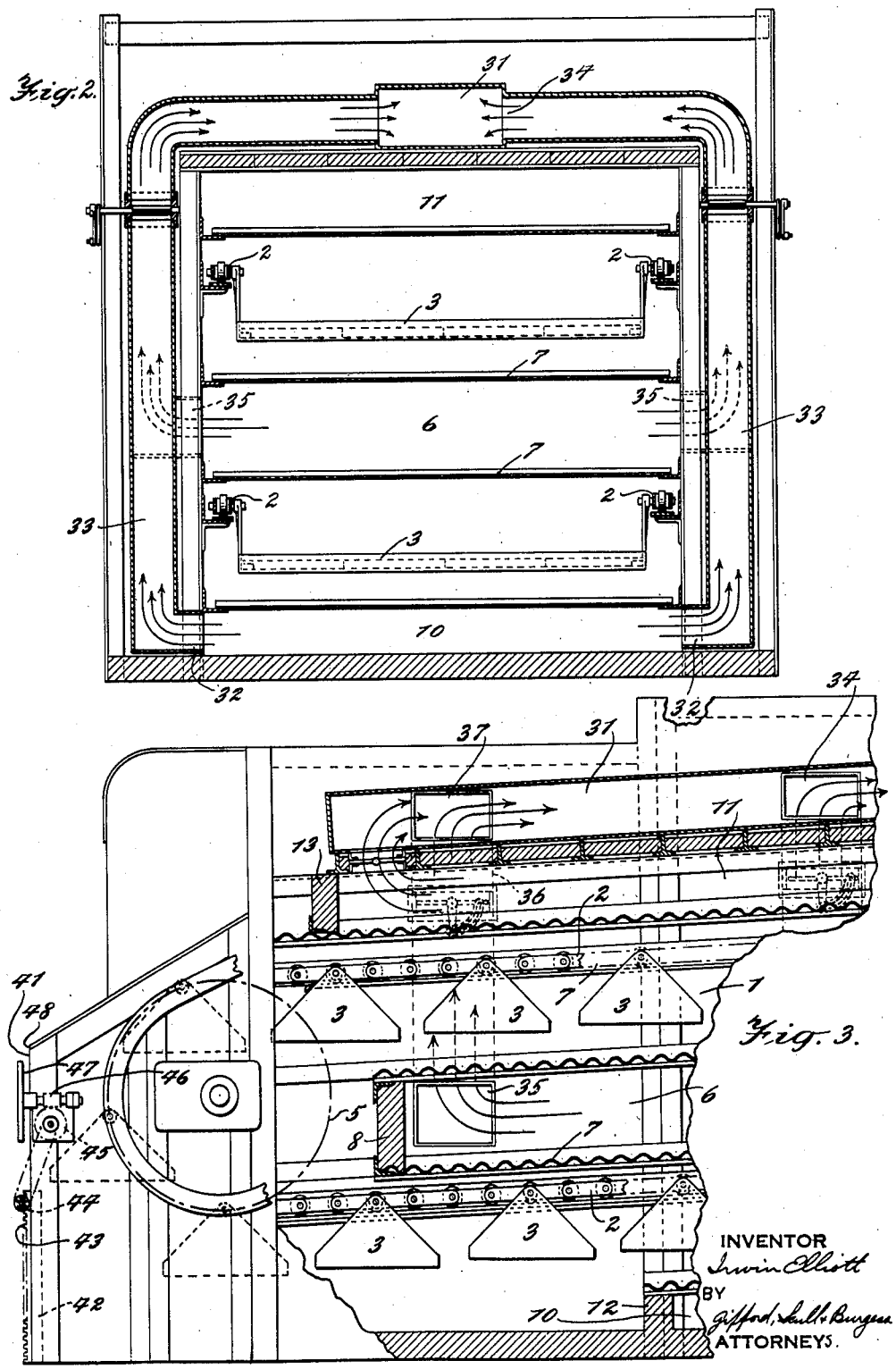

INVENTOR
Irwin Elliott
BY
Gifford, Scull & Burgess
ATTORNEYS.

Feb. 13, 1934.  I. ELLIOTT  1,946,843
BAKING OVEN
Filed Aug. 7, 1930  5 Sheets-Sheet 4

INVENTOR
Irwin Elliott
BY
Gifford, Scull & Burgess
ATTORNEYS.

Feb. 13, 1934.　　　　　I. ELLIOTT　　　　　1,946,843
BAKING OVEN
Filed Aug. 7, 1930　　　5 Sheets-Sheet 5
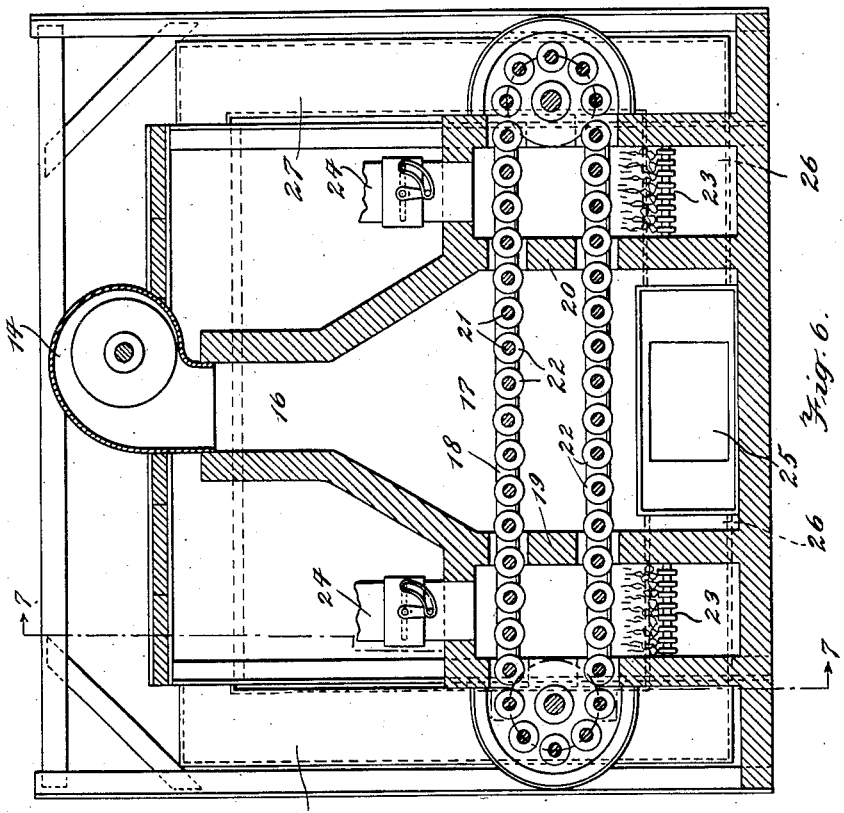

Patented Feb. 13, 1934

1,946,843

UNITED STATES PATENT OFFICE 1,946,843

BAKING OVEN

Irwin Elliott, Harmon, N. Y., assignor to Universal Oven Company, Incorporated, New York, N. Y., a corporation of New York Application August 7, 1930. Serial No. 473,574

9 Claims. (Cl. 107—57)

This invention relates to a novel and improved form of baking oven, the novel features of which will be best understood from the following description and the annexed drawings, in which I have shown a selected embodiment of the invention, and in which:—

Fig. 1 is a vertical longitudinal section through a baking oven constructed according to my invention;

Fig. 2 is a section on an enlarged scale taken on the line 2—2 of Fig. 1;

Fig. 3 is a view on an enlarged scale taken on the same plane as Fig. 1 and showing the arrangement of parts at the left-hand end of that figure;

Fig. 6 is a section on the line 6—6 of Fig. 1;

Fig. 7 is a view taken approximately on the line 7—7 of Fig. 6.

Figure 4:
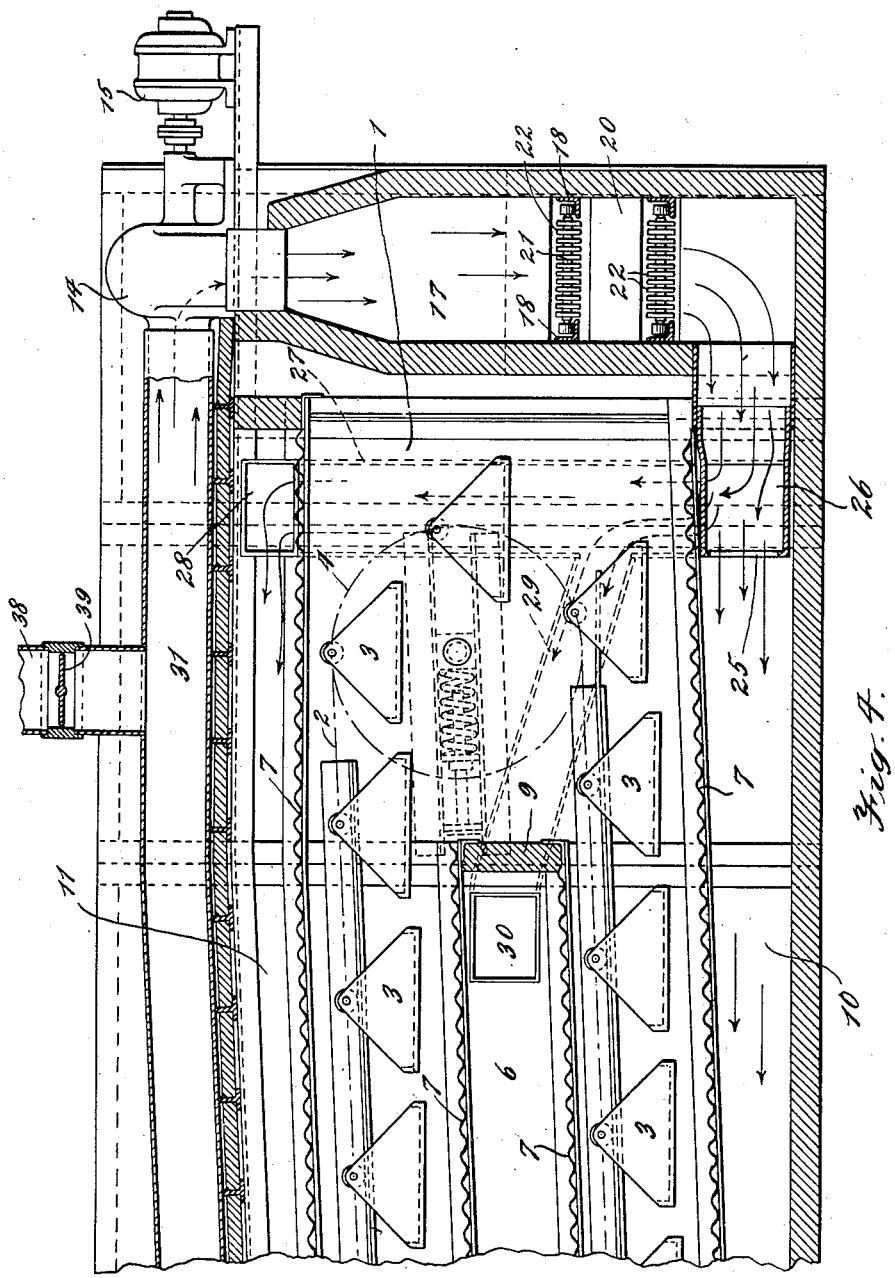
Fig. 4 is a view similar to Fig. 3, but showing the arrangement of parts at the right-hand end of Fig. 1.
Figure 5:
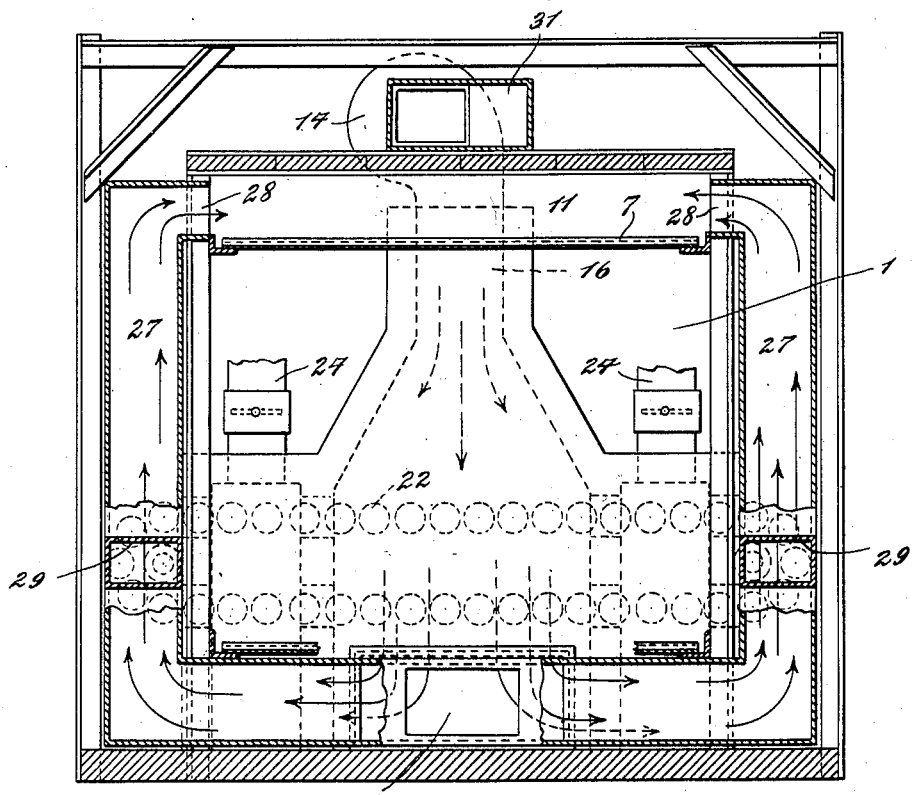
Fig. 5 is a section on the line 5—5 of Fig. 1.

In the illustrated form, the invention comprises an oven having a heating chamber 1 through which travels a conveyor 2 carrying trays 3 on which are disposed articles of food which are to be baked. The conveyor may be of any usual form and is here shown as one comprising a chain from which the trays are hung in such a way that the tray bottoms are always substantially horizontal. The chain runs over sprockets 4 and 5 at opposite ends of the conveyor in such a way that they form upper and lower reaches.

The sprocket 4 is shown as slightly higher than the sprocket 5, so that the reaches are slightly inclined to the horizontal. Between the reaches is disposed a heating chamber 6 which is separated throughout from the baking chamber by heat conducting walls, here shown as formed by corrugated sheet metal 7. The opposite end walls 8 and 9 may be formed of refractory material of any suitable kind.

Disposed beneath the lower reach is another heating chamber 10, and above the upper reach is a heating chamber 11, it being noted that these chambers are substantially parallel to the lower and upper reaches respectively, and are separated from the baking oven by means of corrugated metal walls. The end walls 12 and 13 of these chambers, respectively, are formed of other material such as refractory.

All of the heating chambers described above are tightly sealed against leakage to the baking chamber, so that heat is conducted to the baking chamber entirely by conduction through the separating walls which are largely of the corrugated metal indicated.

Hot gases are passed through the heating chambers to supply the necessary heat, and preferably these gases are circulated through a closed system in which there is a heat exchanging device to impart heat thereto before the gases enter the heating chambers.

Circulation in the closed system is caused by a suitable pump 14 which may be operated by an electric motor 15, it being understood that this motor is supplied with any usual controls for varying the speed thereof, whereby the pump or fan may be regulated as to speed. The gases discharged from the pump pass downwardly through a vertical extending passage 16, which passage, as shown in Fig. 6, widens out into a chamber 17 forming a part of the passage, and there the gases from the pump pass over a heat exchanging device in the form of an endless metallic member, here shown in the form of a chain 18 which passes through the chamber 17 and through holes in opposite walls 19 and 20 thereof.

The chain is shown as formed of spindles 21 on which are mounted a plurality of discs 22, the entire construction being of cast iron or other material which will absorb heat and dissipate it to the gases in the chamber 17. The discs are heated by any suitable means disposed outside the walls 19 and 20, this means being indicated diagrammatically as grates 23 disposed in combustion chambers beyond the walls 19 and 20 and upon which coal may be burned. It is, of course, to be understood that gas or any other suitable fuel may be used and that the combustion chambers are supplied with suitable flues 24 for the escape of products of combustion. While they have been omitted from this showing, it is to be understood that suitable seals may be provided in the holes in the walls 19 and 20 so as to prevent escape of products of combustion into the chamber 17, but ordinarily these would not be found necessary because of the fact that the chamber 17 and other chambers connected thereto are sealed from the baking oven.

After the gases reach the chamber 17 and pass over the heating device 18, they then divide into a plurality of streams, one stream passing through the inlet 25 into the chamber 10, and other streams passing through outlets 26 in the side walls of the chamber 17. The streams passing through these outlets are in turn divided, one part extending upwardly through vertical ducts 27 whence they are discharged at 28 into the upper heating chamber 11, while another part of the same stream is carried through ducts 29 and discharged at 30 into the heating chamber 6.

The main stream of hot gases is reunited in a return duct 31 at top of the oven, and this duct communicates with the pump or fan 14. As plainly shown in Figs. 1 and 2, the chamber 10 has outlets 32 which connect with upwardly extending ducts 33 which discharge into the duct 31 at 34. These ducts are arranged on each side of the oven, as plainly shown in Fig. 2.

Similarly, the chamber 6 is provided with outlets 35 connecting with vertical extending ducts 36 on each side of the oven and which discharge into the duct 31 and 37. The duct 31 is provided with a flue 38 leading therefrom and normally closed by a damper 39, the position of which may be regulated as by a handle 40, this furnishing an additional method of regulating the heat imparted to the oven.

In operation, the conveyor is set in motion by any suitable operating mechanism, and articles to be baked are inserted and removed through the opening 41 which is closed by a door 42, this door being operated by any suitable mechanism, here shown as a rack 43 engaging a pinion 44 which is operated from a shaft 45 which, in turn, is rotated by a worm 46 on a shaft operated by a handle 47. It will be noted that this door is adjacent the sprocket 5 which is lower than the sprocket 4.

It will also be noted that the top edge 48 of the opening 41 is beneath the level of the lowest tray in the upper reach of the conveyor. Therefore, when steam or other fluid is injected into the oven through the opening 41, as is often done, this steam cannot escape through the opening without passing over all of the trays in the upper reach. In other words, a trap for the steam is formed at the higher or right-hand end of the baking chamber as viewed in Fig. 1.

During the passage of the trays with their contents through the baking chamber, they are adequately heated by radiation of heat from the corrugated walls which separate the baking chamber from the heating chambers. Heat, in turn, is supplied to the heating chambers by the means before described and which is best shown in Figs. 6 and 7.

The circulation system, including the heating chambers, is all closed and tightly sealed, and therefore any products of combustion which may escape into the system do not reach the baking chamber. The gases in this closed circulating system are efficiently heated by being discharged into the enlarged chamber 17 wherein they expand, thus decreasing the velocity and passing slowly over a larger surface of heat exchange elements than would be the case if they were not so expanded. It will also be noted that the gases passing over the elements of the heat exchange device contact with the discs, which present large flat surfaces parallel to the direction of the flow of the gases and thus a large area is provided for the efficient exchange of heat.

While I have used the expression "baking oven", and while the invention is adapted for use with an oven for the baking of food, it is to be understood that the invention is not so limited, but can be used wherever materials or articles are to be subjected to the action of heat, and the word "baking" is to be read not in the limited sense of baking food, but of imparting the heat to articles which it is desired to treat by the application of heat.

While I have shown the invention as embodied in a specific form, it is to be understood that various changes in details may be made without departing from the scope of the invention, and I therefore do not intend to limit myself except by the appended claims.

I claim:

1. A baking oven comprising a baking chamber, a heating chamber adjacent said baking chamber and separated therefrom by a heat conducting wall, means to supply hot gases to said heating chamber, said means comprising a passage for said gases, an endless metallic heat exchange device adapted to move through said passage, and means to heat said device at opposite sides of said passage.

2. A baking oven comprising a baking chamber, a heating chamber adjacent said baking chamber and separated therefrom by a heat conducting wall, means to supply hot gases to said heating chamber, said means comprising a relatively narrow passage adapted to receive said gases and widening out into a chamber forming part of the passage, an endless metallic heating device extending across said passage and through opposite walls thereof whereby the hot gases are caused to expand and come into extended contact with said device, means for continually moving said device across the passage, and means outside of said passage for heating said device.

3. A baking oven comprising a tray conveyor having upper and lower reaches, a baking chamber containing said conveyor, a heating chamber disposed beneath the lower reach of the conveyor, a heating chamber disposed above the upper reach of the conveyor, a heating chamber disposed between said reaches, walls separating said heating chambers from said baking chamber and preventing passage of gases from the heating chambers to the baking chamber, means for heating a stream of gases comprising a device continually moving through said stream, means for dividing said stream and passing the divided parts through said heating chambers, and means for reuniting said parts into a single stream and for recirculating it past said heating means.

4. In combination, a chamber adapted to contain articles to be heated, a heating chamber separated from said first-named chamber by a heat conducting wall, a closed circulating system including said heating chamber, means to circulate gases through said system, a heat exchange device comprising means movable into and out of said circulating system, and means to impart heat to said movable means outside of said system.

5. In a device of the class described, a passage for gases, an endless chain running through said passage, means for heating said chain at one side of said passage, means causing the gases in the passage to pass over said chain transversely thereof, and means on the chain presenting a plurality of surfaces generally parallel to the direction of flow of the gases over the chain.

6. In a device of the class described, an endless chain, means forming a passage across which said chain moves, means outside of said passage for imparting heat to said chain, said chain comprising a plurality of pins carrying flat elements thereon with the flat faces of the elements extending transversely of the length of the chain, and means for causing gases to flow through said passage transversely of the chain and substantially parallel to the faces of said elements.

7. In combination, a chamber adapted to contain articles to be heated, a heating chamber separated from said first-named chamber by a heat conducting wall, a closed circulating system including said heating chamber, means to circulate gases through said system, a heat exchange device comprising an endless metallic member, means for moving said member continually into and out of said circulating system, and means to impart heat to said member outside of said system.

8. In combination, a chamber adapted to contain articles to be heated, a heating chamber separated from said first-named chamber by a heat conducting wall, a closed circulating system including said heating chamber, means to circulate gases through said system, a heat exchange device comprising an endless metallic member having extensive heating surfaces, means to move said member continually into and out of a part of said circulating system, means outside of said system to impart heat to said surfaces, and means within the system to cause said gases to circulate over said surfaces.

9. In a device of the class described, a passage for gases, an endless metallic member running through said passage, means at one side of the passage for heating said member, means to move said metallic member through said passage from one side to the other, means causing the gases in the passage to pass over the member transversely thereof, and means on the member presenting extensive heating surfaces to the heating means and to the gases passing thereover.

IRWIN ELLIOTT.